July 15, 1924.
V. KARAPETOFF
1,501,458
PARALLEL DOUBLE TONGS
Filed July 20, 1922
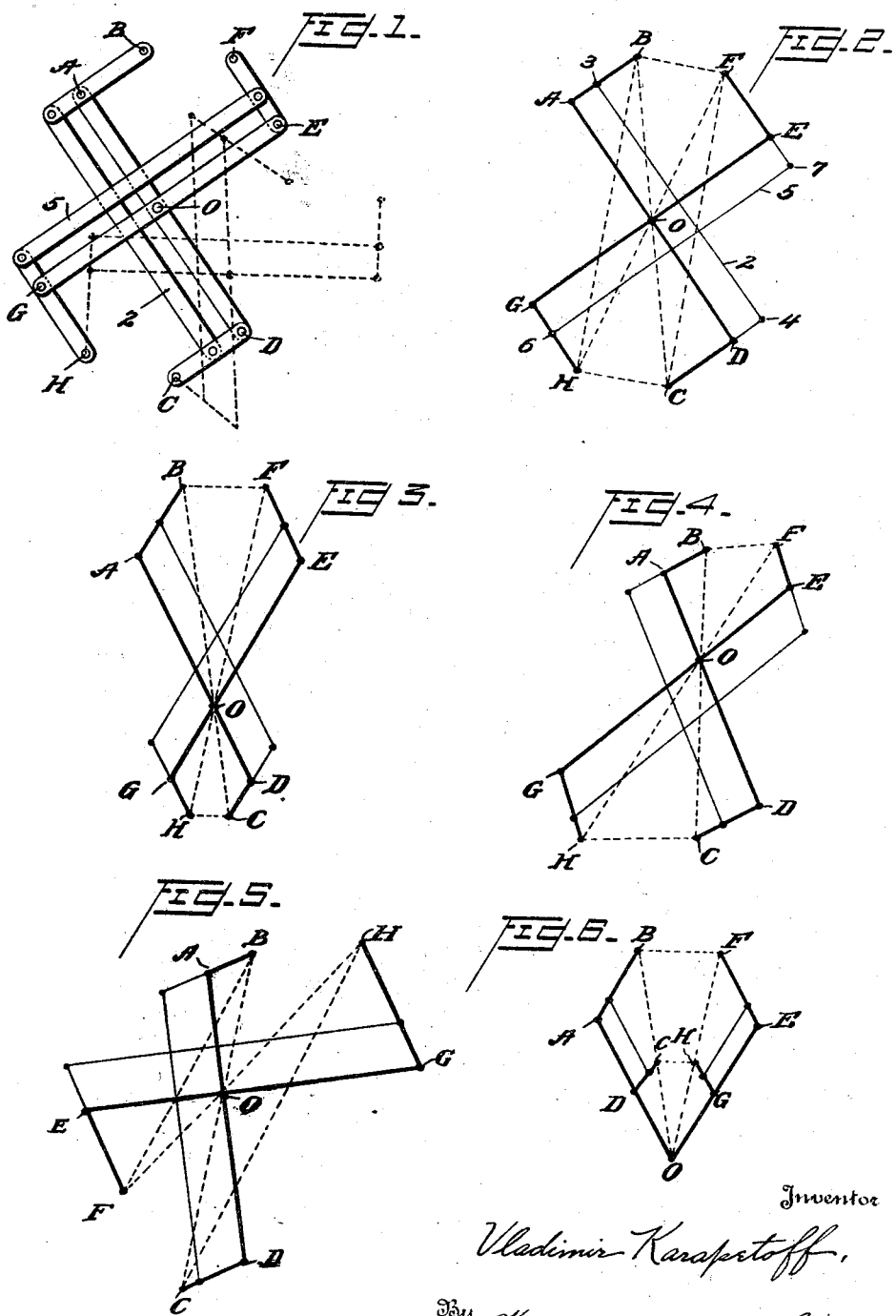
Inventor
Vladimir Karapetoff,
By Watson, Coit, Morse + Grindle
Attorneys Patented July 15, 1924.

1,501,458

UNITED STATES PATENT OFFICE.

VLADIMIR KARAPETOFF, OF ITHACA, NEW YORK.

PARALLEL DOUBLE TONGS.

Application filed July 20, 1922. Serial No. 576,379.

*To all whom it may concern:*

Be it known that I, VLADIMIR KARAPETOFF, a citizen of the United States, residing at city of Ithaca, county of Tompkins, and State of New York, have invented certain new and useful Improvements in Parallel Double Tongs, of which the following is a specification.

The subject of the present invention is a link mechanism suitable for use as an instrument of precision or as a mechanical movement. The immediate object of the invention is to produce an instrument by means of which a given vector may be readily transmitted to any desired position in a plane; and the illustrative embodiment of the invention shown by the drawings accompanying this specification is a drafting instrument adapted to perform this function. The invention may also be embodied in mechanical movements of organized machines, and it is intended therefore to claim the invention both specifically as an instrument of precision and broadly as a kinematic system without restriction to any specific function.

Briefly stated the invention comprises a pair of links pivoted together, a pair of arms pivoted to each link and means to maintain the arms of each pair parallel. More specifically, the invention comprises a pair of links pivoted together, a pair of arms pivoted to each link at spaced points thereon, and means to maintain the arms of each pair parallel, the distances defined by the pivot points of the system and the lengths of the arms being so correlated that the lines joining the free ends of corresponding arms are parallel and the ratio between the lengths of said lines is constant, in all positions of the linkage system. The invention is therefore adapted for use as an instrument of precision for transmitting a given length or line parallel to itself to any desired position in a plane. For if the free ends of corresponding arms be made to coincide with the ends of the line, or vector, to be transmitted, and the ends of the other pair of arms be fixed, it follows that the linkage may be operated about the fixed ends to move the line defined by the free ends to the desired position, the said line remaining at all times constant in magnitude and parallel to its original position.

Referring to the accompanying drawings for a description of one practical embodiment of the invention and for a mathematical demonstration of the principle of the invention:—

Figure 1 represents a drafting instrument embodying the invention; and

Figures 2 and 6 are diagrammatic views.

The principle of the present invention may be expressed as follows: Given a link having two parallel arms pivoted thereto at spaced points A and D, the arm pivoted at A having a point B fixed relatively thereto and the arm pivoted at D having a point C fixed thereto and a second link having two parallel arms pivoted thereto at spaced points E and G, the arm pivoted at E having a point F fixed relatively thereto and the arm pivoted at G having a point H fixed relatively thereto; then if the said links be pivoted together at a point O, such that $$\frac{AB}{DC} = \frac{OA}{OD} = \frac{EF}{GH} = \frac{OE}{OG},$$

the line joining B and F will be parallel to the line joining H and C and the ratio between said lines will be constant, in any position assumed by the system and if the ratios be $$\frac{AB}{DC} = \frac{OA}{OD} = \frac{GH}{EF} = \frac{OG}{OE},$$

then the line joining B and H will be parallel to the line joining F and C and the ratio of these lines will be constant in all positions of the system.

The truth of the foregoing principle will be evident from a consideration of the diagrammatic views, Figures 2 to 6. In all these figures the heavy lines represent the links and arms to be considered in the mathematical analysis of the system, while the light lines represent links that are employed merely to maintain parallelism between the said arms of the respective pairs. Figure 2 shows a system in which the links AD and EG are pivoted together at the bisection point of each. In Figures 3, 4 and 5 the links are pivoted intermediate their ends but not at their bisection points, Figure 6 illustrates the special case in which the links are pivoted together at an end of each. The positions of the system shown by the different views are arbitrarily chosen. It is assumed, in Figures 1, 2, 3, 4 and 6, that $$\frac{AB}{DC}=\frac{OA}{OD}=\frac{EF}{GH}=\frac{OE}{OG},$$

and that EF is parallel to GH and AB parallel to CD; and it will be shown that with these relations existing between the links and arms, BF is parallel to HC and $\frac{BF}{HC}$ is a constant in all positions of the linkage system.

Draw the lines OB, OF, OC and OH. In triangles OEF and OGH angle FEO=angle HGO (since EF is parallel to GH), and $$\frac{OE}{OG}=\frac{EF}{GH}$$

(given). Therefore, these triangles are similar and hence have corresponding angles equal and corresponding sides proportional. Similarly, it may be shown that triangles ODC and OAB are similar. Since therefore angle DOC=angle AOB and angle EOF=angle GOH (these being corresponding angles of similar triangles) it follows that BOC and FOH are straight lines and angle BOF=angle HOC. Since $$\frac{OB}{OC}=\frac{OA}{OD}$$

(corresponding sides of similar triangles are proportional) and $$\frac{OF}{OH}=\frac{OE}{OG}$$

and angle BOF=angle HOC the triangles OBF and OCH are similar. Therefore BF is parallel to HC. Further, since $$\frac{BF}{HC}=\frac{OB}{OC} \text{ and } \frac{OB}{OC}=\frac{OA}{OD}, \frac{BF}{HC}$$

is a constant.

In the case of Figure 5 the distances defined by the pivot points of the system and the lengths of the arms are so correlated that the lines BF and HC are parallel and bear a constant ratio, in all positions of the system. The relations which must exist in order that this be true are $$\frac{AB}{DC}=\frac{OA}{OD}=\frac{EF}{GH}=\frac{OE}{OG},$$

EF parallel to GH, and AB parallel to DC. It will be noted that these are the same relations that condition the parallelism of BF and HC (in Figs. 1, 2, 3, 4 and 6), except that the proportions between one link and its arms are reversed with respect to the former case. The proof for Figure 5 will be obvious in view of the proof already given for Figures 1, 2, 3 and 6.

It will be observed, therefore, that the linkage system may be so constructed that the lines joining the ends B and F, and H and C of the arms are parallel and bear a fixed ratio (in Figs 1, 2, 3, 4, and 6); or that the lines joining the ends B and F and G and C are parallel and bear a fixed ratio (Fig. 5) in all positions of the system. In the special case illustrated by Figures 1 and 2, where the links AD and EG are pivoted together at the bisection point of each, the arms AB, CD, EF and HG are necessarily equal; and, not only is BF equal and parallel to HC, but also BH is equal and parallel to FC, in all positions of the linkage.

In the embodiment shown in Figure 1 the links AD and EG are pivoted together at O, the bisection point of each link, and the arms AB, DC and EF, GH are all equal, the parallel link 2 being pivoted to CD and to an extension of AB, and the parallel link 5 being pivoted to EF and to an extension of GH. The free ends of the arms AB, EF, DC and GH, each have means for determining a point fixed relatively thereto, which means may be a circular hole formed in the free end of each arm, the relatively fixed point being the center of the circle. With an instrument thus constructed it is possible to transfer a given vector to any position in a plane very readily. To do this it is only necessary to make the ends of the vector coincide with the centers B and F, say, then fix the centers H and C, whereupon the linkage may be moved to bring BF to any desired position, it being understood that with centers H and C fixed BF will not vary in magnitude and direction as the linkage is moved about the centers H and C, that is to say, BF in its final position will be equal to the vector in length and parallel thereto. The dotted lines in Figure 1 show one of an indefinite number of positions to which the linkage may be moved about the centers H and C. Due to the construction of this particular instrument it is possible to use it as just described, or to fix points H and B, whereupon CF may be moved to any position in the plane parallel to itself, maintaining invariably its magnitude and direction.

From the foregoing description it will be understood that the device is capable of many different uses. For instance, if HC is varied in any arbitrary manner, either in direction or magnitude or both, BF will change automatically, and always remain equal and parallel to HC. Thus, the device enables one to keep a point, such as F, at a desired constant or variable distance from a point B, when the latter is moving in any arbitrary fashion in a plane. It also permits a stationary observer at HC to measure a constant or variable distance BF on a moving object. Various uses for the invention other than its use as a drafting instrument are thus suggested.

Having thus described my invention what I claim as new and desire to secure by Letters Patent is:

1. A kinematic system comprising two links pivoted together, a pair of arms pivoted to each link at spaced points, each arm having means for defining a point fixed relatively thereto, means for maintaining the arms of the respective pairs parallel, the pivot points of the system and said relatively fixed points being so located that the line joining the point fixed relatively to an arm of one pair to the point fixed relatively to the corresponding arm of the other pair is parallel to the line joining the point fixed relatively to the other arm of said one pair to the point fixed relatively to the corresponding arm of said other pair, in all positions of the system.

2. A kinematic system comprising two links pivoted together, a pair of arms pivoted to each link at spaced points and having free outer ends, and means for maintaining the arms of the respective pairs parallel, each arm having means for defining a point fixed relatively thereto, the pivot points of the system and the points fixed relatively to said arms being so chosen that the lines joining the points fixed relatively to corresponding arms are always parallel.

3. A kinematic system comprising two links pivoted to each other, a pair of arms pivoted to each link at spaced points and having free outer ends and means for maintaining parallelism between the arms of the respective pairs, the pivot points of the system and the lengths of the arms being so located and proportioned that the lines joining the ends of corresponding arms are parallel at all positions of the system.

4. A kinematic system comprising two links pivoted together intermediate their ends, a pair of arms pivoted to each link on opposite sides of the pivot connection between said links, each arm having means for defining a point fixed relatively thereto, means for maintaining the arms of the respective pairs parallel, the pivot points of the system and said relatively fixed points being so located that the line joining the point fixed relatively to the arm of one pair to the point fixed relatively to the corresponding arm of the other pair is parallel to the line joining the point fixed relatively to the other arm of the first pair to the point fixed relatively to the corresponding arm of the second pair, in all positions of the system.

5. A kinematic system comprising two links pivoted together intermediate their ends, a pair of arms pivoted to each link at the ends thereof, and means for maintaining the arms of the respective pairs parallel, each arm having means for defining a point fixed relatively thereto, the pivot points of the system and the points fixed relatively to said arms being so located that the lines joining the points fixed relatively to corresponding arms are parallel in all positions of the system.

6. A kinematic system comprising a link having two arms pivoted thereto at points A and D, the arm pivoted at A having means for defining a point B fixed relatively thereto and the arm pivoted at D having means for defining a point C fixed relatively thereto, means for maintaining said arms parallel, a second link having two arms pivoted thereto at points E and G, the arm pivoted at E having means for defining a point F fixed relatively thereto and the arm pivoted at G having means for defining a point H fixed relatively thereto, and means for maintaining said last two arms parallel, said links being pivoted together at a point O such that $$\frac{AB}{DC} = \frac{OA}{OD} = \frac{EF}{GH} = \frac{OE}{OG}.$$

7. A kinematic system, comprising a link having two arms pivoted thereto at points A and D, the arm pivoted at A having means for defining a point B fixed relatively thereto and the arm pivoted at D having means for defining a point C fixed relatively thereto, means for maintaining AB parallel to DC, a second link having two arms pivoted thereto at points E and G, the arm pivoted at E having means for defining a point F fixed relatively thereto and the arm pivoted at G having means for defining a point H fixed relatively thereto, and means for maintaining EF parallel to GH, said links being pivoted together at a point O such that the lines HC and BF are parallel at all positions of the system.

8. An instrument for transmitting a given distance parallel to itself, comprising two links pivoted together intermediate their ends, an arm pivoted to the outer end of each link, two rigid bars, one pivotally connected to the two arms of the respective pairs at points equidistant from the pivot points of the arms, whereby the arms of the respective pairs are maintained parallel, each arm having means for locating a point fixed relatively thereto, the pivot points of the system and the points fixed relatively to said arms being so located that the lines joining the points fixed relatively to corresponding arms are always parallel.

9. A kinematic system comprising two links pivoted together intermediate their ends, a pair of arms pivoted to each link, the pivot points of all said arms being equidistant from the pivot axis of said links, each arm having means for locating a point fixed relatively thereto and at the same distance from the pivot point thereof, and means for maintaining the arms of the respective pairs parallel in the different positions of the system.

10. An instrument for transmitting a given distance parallel to itself, comprising two links pivoted together at the center point of each link, a pair of arms pivoted to each link, the pivot points of all said arms being equidistant from the pivot point of said links, each arm having means for locating a point fixed relatively thereto and at the same distance from the pivot point thereof, a rigid bar for each link parallel thereto and having its ends pivoted to one arm and to an extension of the other arm at points the same distance from the pivots of said arms.

11. A device of the character described including in combination, a pair of links pivoted together, a pair of arms pivoted to each link, and means to maintain the arms of each pair parallel.

12. A device of the character described including in combination, a pair of links of equal length pivoted together, a pair of arms pivoted to each link, and means to maintain the arms of each pair parallel.

In testimony whereof I hereunto affix my signature.

VLADIMIR KARAPETOFF.